United States Patent [19]

Oguchi et al.

[11] Patent Number: 5,646,273
[45] Date of Patent: Jul. 8, 1997

[54] PHTHALOCYANINE COMPOUND AND OPTICAL RECORDING MEDIUM CONTAINING IT

[75] Inventors: Takahisa Oguchi, Mobara; Hideki Umehara, Yokohama; Kenichi Sugimoto, Yokohama; Ryu Oi, Yokohama; Hisato Itoh, Yokohama, all of Japan

[73] Assignees: Mitsui Toatsu Chemicals, Inc., Tokyo; Yamamoto Chemicals, Inc., Yao, both of Japan

[21] Appl. No.: 531,059

[22] Filed: Sep. 20, 1995

Related U.S. Application Data

[63] Continuation of Ser. No. 221,257, Mar. 31, 1994, abandoned.

[30] Foreign Application Priority Data

Apr. 9, 1993 [JP] Japan .................. 5-082353

[51] Int. Cl.$^6$ .................................. C09B 47/04
[52] U.S. Cl. .................. 540/122; 540/128; 540/140; 430/270.17
[58] Field of Search .................. 430/270.2, 270.17; 540/140, 142, 143, 122, 128, 138

[56] References Cited

U.S. PATENT DOCUMENTS

| | | |
|---|---|---|
| 4,960,538 | 10/1990 | Itoh et al. . |
| 4,970,021 | 11/1990 | Nakatsuka et al. . |
| 5,024,926 | 6/1991 | Itoh et al. . |
| 5,124,067 | 6/1992 | Itoh et al. . |
| 5,220,010 | 6/1993 | Oguchi et al. . |
| 5,270,463 | 12/1993 | Itoh et al. . |
| 5,280,114 | 1/1994 | Itoh et al. .................. 540/122 |
| 5,296,162 | 3/1994 | Itoh et al. . |

FOREIGN PATENT DOCUMENTS

| | | |
|---|---|---|
| 0 232 427 | 8/1987 | European Pat. Off. . |
| 0 462 368 | 12/1991 | European Pat. Off. . |
| 0 513 370 | 11/1992 | European Pat. Off. . |
| 0 519 423 | 12/1992 | European Pat. Off. . |

OTHER PUBLICATIONS

CA 120:334577; 120:311488; 119:191971 119:51325; 113:201458; 111:41363.
Database WPI, Derwent Publications Ltd., AN 92-310933, JP-A-4214388, Aug. 5, 1992.
Database WPI, Derwent Publications Ltd., AN 93-331096, JP-A-5238150, Sep. 17, 1993.

Primary Examiner—Thorl Chea
Attorney, Agent, or Firm—Oblon, Spivak, McClelland, Maier & Neustadt, P.C.

[57] ABSTRACT

A phthalocyanine represented by the formula (1)

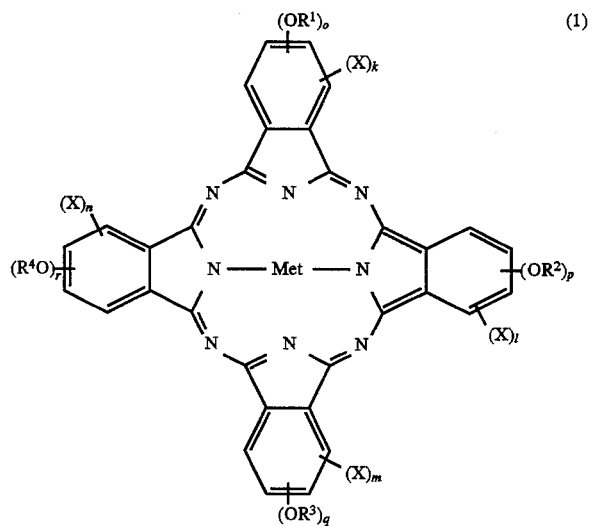

wherein each of $R^1$, $R^2$, $R^3$ and $R^4$ is independently an alkyl group substituted by 0 to 5 halogen atoms and having 1 to 20 carbon atoms, an alkenyl group substituted by 0 to 5 halogen atoms and having 2 to 20 carbon atoms or an alkynyl group substituted by 0 to 5 halogen atoms and having 2 to 20 carbon atoms, and at least one of $R^1$, $R^2$, $R^3$ and $R^4$ is substituted by the halogen atom; X is a halogen atom; each of k, l, m and n is independently a value of from 0 to 3; each of o, p, q and r is independently a value of 0, 1 or 2, and all of them are not 0 simultaneously; each sum of k and o, l and p, m and q, and n and r is independently in the range of from 0 to 4; Met is two hydrogen atoms, a divalent metal atom, a trivalent mono-substituted metal atom, a tetravalent di-substituted metal atom or an oxymetal atom; an optical recording medium formed by adding this phthalocyanine to a recording layer; and a near infra-red absorbing agent comprising the phthalocyanine. The above-mentioned phthalocyanine can be used to provide the optical recording medium having excellent characteristics of reflectance, sensitivity, recording properties, stability to reproduction light, shelf stability and the like.

16 Claims, No Drawings

1

PHTHALOCYANINE COMPOUND AND OPTICAL RECORDING MEDIUM CONTAINING IT

This application is a Continuation of application Ser. No. 08/221,257, filed on Mar. 31, 1994, now abandoned.

BACKGROUND OF THE INVENTION

(1) Field of the Invention

The present invention relates to a compound useful as a novel recording material for optical discs and a near infrared-absorbing agent which can play an important role in optoelectronics fields of information recording, display sensors, protective spectacles and the like; an optical recording medium such as an optical disc or an optical card in which the compound is contained in a recording layer; and a near infrared-absorbing agent comprising the compound.

(2) Description of the Related Art

Techniques for utilizing phthalocyanine dyestuffs in recording layers of recording media such as optical discs and optical cards are widely known by Japanese Patent Application Laid-open Nos. 154888/1986 (EP 18646), 197280/1986, 246091/1986, 39286/1987 (U.S. Pat. No. 4,769,307), 37991/1988 and 39388/1988, but the phthalocyanines disclosed in these publications have been insufficient as the recording media from the viewpoints of sensitivity, refractive index, recording properties and the like. A compound in which they have been improved is described in Japanese Patent Application Laid-open No. 62878/1991, but this compound is still poor in recording properties at the time of writing by a laser beam, and so it is not sufficiently practical yet. Furthermore, it is disclosed in Japanese Patent Laid-open Nos. 214388/1992 and 238150/1993 that a phthalocyanine in which fluorine is introduced into a substituent is excellent in solubility and adhesive properties to a resin, but the introduction of the fluorine group does not contribute to the improvement of the sensitivity at the time of the writing by the laser beam.

The above-mentioned phthalocyanines do not have sufficient performances regarding sensitivity (a C/N ratio or an optimum recording power), reflectance, recording properties (the shape of a signal at recording) and the like.

SUMMARY OF THE INVENTION

An object of the present invention is to provide a dyestuff capable of forming an optical recording medium which can hold the above-mentioned performances, i.e., which has high sensitivity and high reflectance and can form a precise signal at the time of recording.

The present inventors have intensively researched with the intention of achieving the above-mentioned objects, and finally, the present invention has now been completed. That is, the present invention is directed to a phthalocyanine represented by the formula (1)

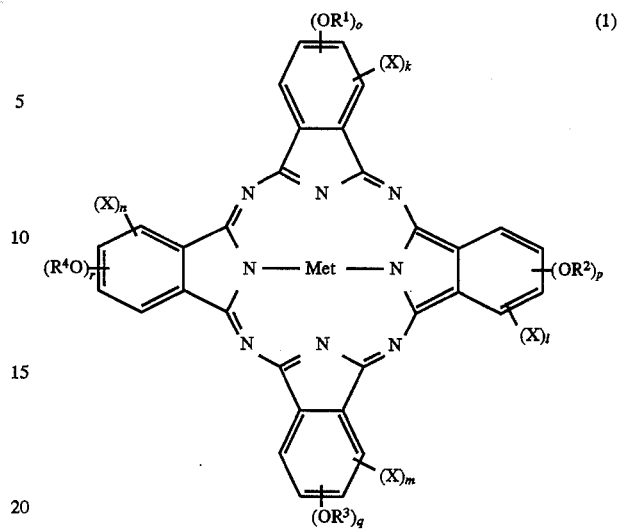

wherein each of $R^1$, $R^2$, $R^3$ and $R^4$ is independently an alkyl group substituted by 0 to 5 halogen atoms and having 1 to 20 carbon atoms, an alkenyl group substituted by 0 to 5 halogen atoms and having 2 to 20 carbon atoms or an alkynyl group substituted by 0 to 5 halogen atoms and having 2 to 20 carbon atoms, and at least one of $R^1$, $R^2$, $R^3$ and $R^4$ is substituted by the halogen atom; X is a halogen atom; each of k, l, m and n is independently a value of from 0 to 3; each of o, p, q and r is independently a value of 0, 1 or 2, and all of them are not 0 simultaneously; each sum of k and o, l and p, m and q, and n and r is independently in the range of from 0 to 4; Met is two hydrogen atoms, a divalent metal atom, a trivalent mono-substituted metal atom, a tetravalent di-substituted metal atom or an oxymetal atom, and the present invention is also directed to an optical recording medium formed by adding the above-mentioned phthalocyanine to a recording layer.

The phthalocyanine of the present invention has a sharp absorption at 650–900 nm and is suitable for recording materials of the optical recording media using a semiconductor laser beam. The functional mechanism of the phthalocyanine of the present invention has not been elucidated and is now under investigation, but it can be presumed that the halogen atom substituted in the alkoxy group contributes to the improvement of the sensitivity at the time of recording to effectively reduce an error of a formed signal. That is, according to the phthalocyanine of the present invention, the decomposition of the dyestuff by the laser beam radiation takes place smoothly at the time of the optical recording with the reduced damage of the substrate giving a highly sensitive and accurate recording. In addition, in the case of the medium having a reflective layer, the adhesive properties of the reflective layer to a recording layer can be improved.

DETAILED DESCRIPTION OF THE PREFERRED EMBODIMENTS

Next, the present invention will be described in detail.

A phthalocyanine of the present invention is characterized in that the α-position of a phthalocyanine ring is substituted by an alkyl group, an alkenyl group or an alkynyl group via an oxygen atom, and this substituent has at least one halogen atom. Here, the halogen atom means chlorine, bromine or iodine, and these different kinds of halogen atoms may be present together in one molecule. Above all, bromine and iodine are particularly preferable. In an optical recording medium using the above-mentioned compound, this halogen atom permits signals to be precisely written at the time of optical recording, so that sensitivity and recording properties can be improved.

In the formula (1), when each of o, p, q and r is independently 2, $OR^1$s, $OR^2$s, $OR^3$s or $OR^4$s present on one benzene ring may be the same or different.

Preferably, the present invention is directed to a phthalocyanine in which each of $R^1$, $R^2$, $R^3$ and $R^4$ is independently an alkyl group substituted by 0 to 5 halogen atoms and having 5 to 15 carbon atoms, an alkenyl group substituted by 0 to 5 halogen atoms and having 5 to 15 carbon atoms or an alkynyl group substituted by 0 to 5 halogen atoms and having 5 to 15 carbon atoms, and at least one of $R^1$, $R^2$, $R^3$ and $R^4$ is substituted by the halogen atom, and each of o, p, q and r is 1; and an optical recording medium formed by adding this phthalocyanine to a recording layer.

Now, a preferable embodiment of the present invention will be described in detail.

Examples of the substituents represented by $OR^1$, $OR^2$, $OR^3$ and $OR^4$ and having no halogen atom in the formula (I) include alkoxy groups having 1 to 20 carbon atoms, alkenyloxy groups having 2 to 20 carbon atoms and alkynyloxy groups having 2 to 20 carbon atoms. Typical examples of these substituents include methoxy, ethoxy, propoxy, butyloxy, pentyloxy, hexyloxy, heptyloxy, octyloxy, nonyloxy, decyloxy, undecyloxy, dodecyloxy, tridecyloxy, tetradecyloxy, pentadecyloxy, hexadecyloxy, heptadecyloxy, octadecyloxy, nonadecyloxy, icosyloxy, vinyloxy, propenyloxy, butenyloxy, pentenyloxy, hexenyloxy, heptenyloxy, octenyloxy, nonenyloxy, decenyloxy, undecenyloxy, dodecenyloxy, tridecenyloxy, tetradecenyloxy, pentadecenyloxy, hexadecenyloxy, heptadecenyloxy, octadecenyloxy, nonadecenyloxy, icosenyloxy, ethynyloxy, propynyloxy, butynyloxy, pentynyloxy, hexynyloxy, heptynyloxy, octynyloxy, nonynyloxy, decynyloxy, undecynyloxy, dodecynyloxy, tridecynyloxy, tetradecynyloxy, pentadecynyloxy, hexadecynyloxy, heptadecynyloxy, octadecynyloxy, nonadecynyloxy and icosynyloxy.

Above all, particularly preferable are groups which have a large steric hindrance and can easily project in a vertical direction of the phthalocyanine ring, and examples of such groups include branched alkoxy groups, alkenyloxy groups and alkynyloxy having 5 to 15 carbon atoms. Typical examples of such groups include 2-methylbutane-1-oxy, 3-methylbutane-1-oxy, 4-methylpentane-3-oxy, 4-methylpentane-2-oxy, 2-methylpentane-3-oxy, 3-methylpentane-2-oxy, 4-methylpentane-2-oxy, 3-methylpentane-3-oxy, 2-methylpentane-2-oxy, 2-methylpentane-3-oxy, 2,3-dimethylbutane-2-oxy, 4-methylhexane-2-oxy, 5-methylhexane-2-oxy, 5-methylhexane-3-oxy, 2,4-dimethylpentane-3-oxy, 2-methylhexane-3-oxy, 2-methyl-5-butylhexane-3-oxy, 3-methylhexane-2-oxy, 2,5-dimethylhexane-3-oxy, 6-methylheptane-2-oxy, 2-methylheptane-3-oxy, 2,2-dimethylheptane-3-oxy, 5-methylheptane-4-oxy, 6-methylheptane-3-oxy, 4-methylheptane-3-oxy, 3,5-dimethylheptane-4-oxy, 2,5-dimethylheptane-4-oxy, 2,4-dimethylheptane-1-oxy, 2,5-dimethyl-5-hexene-3-oxy and 2,5-dimethyl-1-hexene-3-oxy.

Typical examples of alkoxy groups having 1 to 20 carbon atoms, alkenyloxy groups having 2 to 20 carbon atoms and alkynyloxy groups having 2 to 20 carbon atoms which have the halogen atoms include chloromethyloxy, bromomethyloxy, 2-chloroethyl-1-oxy, 2-bromoethyl-1-oxy, 2-iodoethyl-1-oxy, 2-chloropropyl-1-oxy, 1-chloropropyl-2-oxy, 2-bromopropyl-1-oxy, 1-bromopropyl-2-oxy, 2-iodopropyl-1-oxy, 1-iodopropyl-2-oxy, 2,3-dichloropropyl-1-oxy, 2,3-dibromopropyl-1-oxy, 2,3-diiodopropyl-1-oxy, 3-chlorobutyl-1-oxy, 3-bromobutyl-1-oxy, 3-iodobutyl-1-oxy, 3,4-dichloro-2-butyloxy, 3,4-dibromo-2-butyloxy, 3,4-diiodo-2-butyloxy, 1-iodopentane-3-oxy, 2-iodopentane-3-oxy, 1-chloropentane-3-oxy, 2-chloropentane-3-oxy, 1-bromopentane-3-oxy, 2-bromopentane-3-oxy, 1,2-diiodopentane-3-oxy, 1,2-dibromopentane-3-oxy, 5-iodohexane-2-oxy, 6-iodohexane-2-oxy, 6-chlorohexane-2-oxy, 1,2-dichloropentane-3-oxy, 1,2-dibromopentane-3-oxy, 5-iodohexane-2-oxy, 6-iodohexane-2-oxy, 5-chlorohexane-2-oxy, 6-chlorohexane-2-oxy, 5-bromohexane-2-oxy, 6-bromohexane-2-oxy, 5,6-diiodohexane-2-oxy, 5,6-dichlorohexane-2-oxy, 5,6-dibromohexane-2-oxy, 1-iodohexane-3-oxy, 2-iodohexane-3-oxy, 1-chlorohexane-3-oxy, 2-chlorohexane-3-oxy, 1-bromohexane-3-oxy, 2-bromohexane-3-oxy, 1,2-diiodohexane-3-oxy, 1,2-dichlorohexane-3-oxy, 1,2-dibromohexane-3-oxy, 5-iodohexane-1-oxy, 6-iodohexane-1-oxy, 5-chlorohexane-1-oxy, 6-chlorohexane-1-oxy, 5-bromohexane-1-oxy, 6-bromohexane-1-oxy, 5,6-diiodohexane-1-oxy, 5,6-dichlorohexane-1-oxy, 5,6-dibromohexane-1-oxy, 3-iodohexane-1-oxy, 4-iodohexane-1-oxy, 3-chlorohexane-1-oxy, 4-chlorohexane-1-oxy, 3-bromohexane-1-oxy, 4-bromohexane-1-oxy, 3,4-diiodohexane-1-oxy, 3,4-dichlorohexane-1-oxy, 3,4-dibromohexane-1-oxy, 5-iodohexane-1-oxy, 5-chlorohexane-1-oxy, 5-bromohexane-1-oxy, 4,5-diiodohexane-1-oxy, 4,5-dichlorohexane-1-oxy, 4,5-dibromohexane-1-oxy, 1-iodoheptane-4-oxy, 1-chloroheptane-4-oxy, 1-bromoheptane-4-oxy, 2-iodoheptane-4-oxy, 2-chloroheptane-4-oxy, 2-bromoheptane-4-oxy, 1,2-diiodoheptane-4-oxy, 1,2-dichloroheptane-4-oxy, 1,2-dibromoheptane-4-oxy, 3-iodoheptane-4-oxy, 3-chloroheptane-4-oxy, 3-bromoheptane-4-oxy, 2,3-diiodoheptane-4-oxy, 2,3-dichloroheptane-4-oxy, 2,3-dibromoheptane-4-oxy, 1-iodoheptane-3-oxy, 1-chloroheptane-3-oxy, 1-bromoheptane-3-oxy, 2-iodoheptane-3-oxy, 2-chloroheptane-3-oxy, 2-bromoheptane-3-oxy, 1,2-diiodoheptane-3-oxy, 1,2-dichlroheptane-3-oxy, 1,2-dibromoheptane-3-oxy, 1-iodooctane-3-oxy, 1-chlorooctane-3-oxy, 1-bromooctane-3-oxy, 2-iodooctane-3-oxy, 2-chlorooctane-3-oxy, 2-bromooctane-3-oxy, 1,2-diiodooctane-3-oxy, 1,2-dichlorooctane-3-oxy, 1,2-dibromooctane-3-oxy, 1-iodooctane-4-oxy, 1-chlorooctane-4-oxy, 1-bromooctane-4-oxy, 2-iodooctane-4-oxy, 2-chlorooctane-4-oxy, 2-bromooctane-4-oxy, 1,2-diiodooctane-4-oxy, 1,2-dichlorooctane-4-oxy, 1,2-dibromooctane-4-oxy, 3-iodooctane-4-oxy, 3-chlorooctane-4-oxy, 3-bromooctane-4-oxy, 2,3-diiodooctane-4-oxy, 2,3-dichlorooctane-4-oxy, 2,3-dibromooctane-4-oxy, 1-iodononane-3-oxy, 2-iodononane-3-oxy, 1-chlorononane-3-oxy, 2-chlorononane-3-oxy, 1-bromononane-3-oxy, 2-bromononane-3-oxy, 1,2-diiodononane-3-oxy, 1,2-dichlorononane-3-oxy, 1,2-dibromononane-3-oxy, 3-iodo-2-methylbutane-1-oxy, 3-chloro-2-methylbutane-1-oxy, 3-bromo-2-methylbutane-1-oxy, 4-iodo-2-methylbutane-1-oxy, 4-chloro-2-methylbutane-1-oxy, 4-bromo-2-methylbutane-1-oxy, 3,4-diiodo-2-methylbutane-1-oxy, 3,4-dichloro-2-methylbutane-1-oxy, 3,4-dibromo-2-methylbutane-1-oxy, 2-iodo-3-methylbutane-1-oxy, 2-chloro-3-methylbutane-1-oxy, 2-bromo-3-methylbutane-1-oxy, 2,3-dibromo-3-methylbutane-1-oxy, 4-iodo-3-methylbutane-1-oxy, 4-chloro-3-methylbutane-1-oxy, 4-bromo-3-methylbutane-1-oxy, 3-methyl-3,4-dibromobutane-1-oxy, 1-iodo-4-methylpentane-3-oxy, 2-iodo-4-methylpentane-3-oxy, 1-chloro-4-methylpentane-3-oxy, 2-chloro-4-methylpentane-3-oxy, 1-bromo-4-methylpentane-3-oxy, 2-bromo-4-methylpentane-3-oxy, 1,2-diiodo-4-methylpentane-3-oxy, 1,2-dichloro-4-methylpentane-3-oxy, 1,2-dibromo-4-methylpentane-3-oxy, 3-iodo-4-methylpentane-2-oxy, 3-chloro-4-methylpentane-2-oxy, 3-bromo-4-methylpentane-2-oxy, 3,4-dibromo-4-methylpentane-2-oxy, 1-iodo-2-methylpentane-3-oxy, 1-chloro-2-methylpentane-3-oxy, 1-bromo-2-methylpentane-3-oxy, 1,2-dibromo-2-methylpentane-3-oxy, 4-iodo-3-methylpentane-2-oxy, 5-iodo-3-methylpentane-2-oxy, 4-chloro-3-methylpentane-2-oxy, 5-chloro-3-methylpentane-2-oxy, 4-dibromo-3-methylpentane-2-oxy, 5-bromo-3-methylpentane-2-oxy, 4,5-diiodo-3-methylpentane-2-oxy, 4,5-dichloro-3-methylpentane-2-oxy, 4,5-dibromo-3-methylpentane-2-oxy, 5-iodo-4-methylpentane-2-oxy, 5-bromo-4-methylpentane-2-oxy, 4,5-dibromo-4-methylpentane-2-oxy, 1-iodo-3-methylpentane-3-oxy, 2-iodo-3-methylpentane-3-oxy, 1-chloro-3-methylpentane-3-oxy, 2-chloro-3-methylpentane-3-oxy, 1-bromo-3-methylpentane-3-oxy, 2-bromo-3-methylpentane-3-oxy, 1,2-diiodo-3-methylpentane-3-oxy, 1,2-dicholoro-3-methylpentane-3-oxy, 1,2-dibromo-3-methylpentane-3-oxy, 4-iodo-2-methylpentane-2-oxy, 5-iodo-2-methylpentane-2-oxy, 4-chloro-2-methylpentane-2-oxy, 5-chloro-2-methylpentane-2-oxy, 4-bromo-2-methylpentane-2-oxy, 5-bromo-2-methylpentane-2-oxy, 4,5-diiodo-2-methylpentane-3-oxy, 4,5-dichloro-2-methylpentane-3-oxy, 4,5-dibromo-2-methylpentane-3-oxy, 2,3-dimethyl-4-iodobutane-2-oxy, 2,3-dimethyl-4-chlorobutane-2-oxy, 2,3-dimethyl-4-bromobutane-2-oxy, 2,3-dimethyl-3,4-dibromobutane-2-oxy, 4-methyl-5-iodohexane-2-oxy, 4-methyl-5-bromohexane-2-oxy, 4-methyl-4,5-dibromohexane-2-oxy, 5-methyl-6-iodohexane-2-oxy, 5-methyl-6-chlorohexane-2-oxy, 5-methyl-6-bromohexane-2-oxy, 5-methyl-5,6-dibromohexane-2-oxy, 5-methyl-6-iodohexane-3-oxy, 5-methyl-6-chlorohexane-3-oxy, 5-methyl-6-bromohexane-3-oxy, 5-methyl-5,6-dibromohexane-3-oxy, 1-iodo-2,4-dimethylpentane-3-oxy, 1-chloro-2,4-dimethylpentane-3-oxy, 1-bromo-2,4-dimethylpentane-3-oxy, 1,2-dibromo-2,4-dimethylpentane-3-oxy, 2-methyl-5-iodohexane-3-oxy, 2-methyl-6-iodohexane-3-oxy, 2-methyl-5,6-diiodohexane-3-oxy, 2-methyl-5-chlorohexane-3-oxy, 2-methyl-6-chlorohexane-3-oxy, 2-methyl-5,6-dichlorohexane-3-oxy, 2-methyl-5-bromohexane-3-oxy, 2-methyl-6-bromohexane-3-oxy, 2-methyl-5,6-dibromohexane-3-oxy, 2-methyl-4-iodohexane-3-oxy, 2-methyl-4,5-diiodohexane-3-oxy, 2-methyl-4-chlorohexane-3-oxy, 2-methyl-4,5-dichlorohexane-3-oxy, 2-methyl-4-bromohexane-3-oxy, 2-methyl-4,5-dibromohexane-3-oxy, 3-methyl-4-iodohexane-2-oxy, 3-methyl-4-chlorohexane-2-oxy, 3-methyl-4-bromohexane-2-oxy, 3-methyl-3,4-dibromohexane-2-oxy, 2,5-dimethyl-6-iodohexane-3-oxy, 2,5-dimethyl-6-chlorohexane-3-oxy, 2,5-dimethyl-6-bromohexane-3-oxy, 2,5-dimethyl-6,6-dibromohexane-3-oxy, 1,6-diiodo-2,5-dimethylhexane-3-oxy, 1,6-dichloro-2,5-dimethylhexane-3-oxy, 1,2-dibromo-2,5-dimethyl-5-hexane-3-oxy, 1,2-dichloro-2,5-dimethyl-5-hexene-3-oxy, 1,6-dibromo-2,5-dimethylhexane-3-oxy, 5,6-dibromo-2,5-dimethyl-1-hexene-3-oxy, 5,6-dichloro-2,5-dimethyl-1-hexene-3-oxy, 1,2,5,6-tetrabromo-2,5-dimethylhexane-3-oxy, 1,2,5,6-tetrachloro-2,5-dimethylhexane-3-oxy, 5-iodo-6-methylheptane-2-oxy, 5-bromo-6-methylheptane-2-oxy, 5-chloro-6-methylheptane-2-oxy, 5,6-dibromo-6-methylheptane-2-oxy, 5,6-dichloro-6-methylheptane-2-oxy, 1-iodo-2-methylheptane-3-oxy, 1-chloro-2-methylheptane-3-oxy, 1-bromo-2-methylheptane-3-oxy, 1,2-dibromo-2-methylheptane-3-oxy, 1,2-dichloro-2-methylheptane-3-oxy, 2,2-dimethyl-5-iodoheptane-3-oxy, 2,2-dimethyl-6-iodoheptane-3-oxy, 2,2-dimethyl-5-chloroheptane-3-oxy, 2,2-dimethyl-6-chloroheptane-3-oxy, 2,2-dimethyl-5-bromoheptane-3-oxy, 2,2-dimethyl-6-bromoheptane-3-oxy, 2,2-dimethyl-5,6-diiodo-3-oxy, 2,2-dimethyl-5,6-dichloroheptane-3-oxy, 2,2-dimethyl-5,6-dibromoheptane-3-oxy, 1-iodo-5-methylheptane-4-oxy, 2-iodo-5-methylheptane-4-oxy, 1,2-diiodo-5-methylheptane-4-oxy, 1-chloro-5-methylheptane-4-oxy, 2-chloro-5-methylheptane-4-oxy, 1,2-dichloro-5-methylheptane-4-oxy, 1-bromo-5-methylheptane-4-oxy, 2-bromo-5-methylheptane-4-oxy, 1,2-dibromo-5-methylheptane-4-oxy, 6-methyl-7-iodoheptane-3-oxy, 6-methyl-7-chloroheptane-3-oxy, 6-methyl-7-bromoheptane-3-oxy, 6-methyl-6,7-dichloroheptane-3-oxy, 6-methyl-6,7-dibromoheptane-3-oxy, 1,2-diiodo-3,5-dimethylheptane-4-oxy, 1,6-diiodo-3,5-dimethylheptane-4-oxy, 1,7-diiodo-3,5-dimethylheptane-4-oxy, 2,6-diiodo-3,5-dimethylheptane-4-oxy, 6-iodo-3,5-dimethyl-1-heptene-4-oxy, 7-iodo-3,5-dimethyl-1-heptene-4-oxy, 6,7-diiodo-3,5-dimethyl-1-heptene-4-oxy, 1,2-dibromo-3,5-dimethylheptane-4-oxy, 1,6-dibromo-3,5-dimethylheptane-4-oxy, 1,7-dibromo-3,5-dimethylheptane-4-oxy, 2,6-dibromo-3,5-dimethylheptane-4-oxy, 6-bromo-3,5-dimethyl-1-heptene-4-oxy, 7-bromo-3,5-dimethyl-1-heptene-4-oxy, 6,7-dibromo-3,5-dimethyl-1-heptene-4-oxy, 1,2-dichloro-3,5-dimethylheptane-4-oxy, 1,6-dichloro-3,5-dimethylheptane-4-oxy, 1,7-dichloro-3,5-dimethylheptane-4-oxy, 2,6-dichloro-3,5-dimethylheptane-4-oxy, 6-chloro-3,5-dimethyl-1-heptene-4-oxy, 7-chloro-3,5-dimethyl-1-heptene-4-oxy, 6,7-dichloro-3,5-dimethyl-1-heptene-4-oxy, 1,2,6,7-tetrachloro-3,5-dimethylheptane-4-oxy, 1-iodo-2,5-dimethylheptane-4-oxy, 1-bromo-2,5-dimethylheptane-4-oxy, 2-bromo-2,5-dimethylheptane-4-oxy, 1,2-dibromo-2,5-dimethylheptane-4-oxy, 1-chloro-2,5-dimethylheptane-4-oxy, 2-chloro-2,5-dimethylheptane-4-oxy, 1,2-dichloro-2,5-dimethylheptane-4-oxy, 2,4-dimethyl-2-iodoheptane-1-oxy, 2,4-dimethyl-3-iodoheptane-1-oxy, 2,4-dimethyl-2,3-diiodoheptane-1-oxy, 2,4-dimethyl-2,6-diiodoheptane-1-oxy, 2,4-dimethyl-2,7-diiodoheptane-1-oxy, 2,4-dimethyl-3,6-diiodoheptane-1-oxy, 2,4-dimethyl-3,7-diiodoheptane-1-oxy, 2,4-dimethyl-6,7-diiodoheptane-1-oxy, 2,4-dimethyl-2-iodo-6-heptene-1-oxy, 2,4-dimethyl-3-iodo-6-heptene-1-oxy, 2,4-dimethyl-2,3-diiodo-6-heptene-1-oxy, 2,4-dimethyl-6-iodo-2-heptene-1-oxy, 2,4-dimethyl-7-iodo-2-heptene-1-oxy, 2,4-dimethyl-6,7-diiodo-2-heptene-1-oxy, 2,4-dimethyl-2-bromoheptane-1-oxy, 2,4-dimethyl-3-bromoheptane-1-oxy, 2,4-dimethyl-6-bromoheptane-1-oxy, 2,4-dimethyl-7-bromoheptane-1-oxy, 2,4-dimethyl-2,3-dibromoheptane-1-oxy, 2,4-dimethyl-3,6-dibromoheptane-1-oxy, 2,4-dimethyl-3,7-dibromoheptane-1-oxy, 2,4-dimethyl-6,7-dibromoheptane-1-oxy, 2,4-dimethyl-2-bromo-6-heptene-1-oxy, 2,4-dimethyl-3-bromo-6-heptene-1-oxy, 2,4-dimethyl-2,3-dibromo-6-heptene-1-oxy, 2,4-dimethyl-6-bromo-2-heptene-1-oxy, 2,4-dimethyl-7-bromo-2-heptene-1-oxy, 2,4-dimethyl-6,7-dibromo-2-heptene-1-oxy, 2,4-dimethyl-2,3,6,7-tetrachloro-2-heptene-1-oxy, 2,4-dimethyl-2-chloroheptane-1-oxy, 2,4-dimethyl-3-chloroheptane-1-oxy, 2,4-dimethyl-6-chloroheptane-1-oxy, 2,4-dimethyl-7-chloroheptane-1-oxy, 2,4-dimethyl-2,3-dichloroheptane-1-oxy, 2,4-dimethyl-3,6-dichloroheptane-1-oxy, 2,4-dimethyl-3,7-dichloroheptane-1-oxy, 2,4-dimethyl-6,7-dichloroheptane-1-oxy, 2,4-dimethyl-2- chloro-6-heptene-1-oxy, 2,4-dimethyl-3-chloro-6-heptene-1-oxy, 2,4-dimethyl-2,3-dichloro-6-heptene-1-oxy, 2,4-dimethyl-6-chloro-2-heptene-1-oxy, 2,4-dimethyl-7-chloro-2-heptene-1-oxy and 2,4-dimethyl-6,7-dichloro-2-heptene-1-oxy.

Among the substituents having the halogen atoms, particularly preferable examples are groups which has a large steric hindrance and can easily project in a vertical direction of the phthalocyanine ring, and typical examples of such groups include 2,5-dimethyl-5-bromohexane-3-oxy, 2,5-dimethyl-6-bromohexane-3-oxy, 2,5-dimethyl-5,6-dibromohexane-3-oxy, 1-bromo-2,4-dimethylpentane-3-oxy, 2-bromo-2,4-dimethylpentane-3-oxy, 1,2-dibromo-2,4-dimethylpentane-3-oxy, 1-bromo-2,5-dimethylhexane-3-oxy, 2-bromo-2,5-dimethylhexane-3-oxy, 1,2-dibromo-2,5-dimethylhexane-3-oxy, 1-bromo-2,5-dimethyl-5-hexene-3-oxy, 2-bromo-2,5-dimethyl-5-hexene-3-oxy, 1,2-dibromo-2,5-dimethyl-5-hexene-3-oxy, 2,5-dimethyl-5-bromo-1-hexene-3-oxy, 2,5-dimethyl-6-bromo-1-hexene-3-oxy, 2,5-dimethyl-5,6-dibromo-1-hexene-3-oxy, 1-bromo-3,5-dimethylheptane-4-oxy, 2-bromo-3,5-dimethylheptane-4-oxy, 1,2-dibromo-3,5-dimethylheptane-4-oxy, 1,6-dibromo-3,5-dimethylheptane-4-oxy, 1,7-dibromo-3,5-dimethylheptane-4-oxy, 4-methyl-5-bromopentane-2-oxy, 6-bromo-3,5-dimethyl-1-heptene-4-oxy, 7-bromo-3,5-dimethyl-1-heptene-4-oxy, 6,7-dibromo-3,5-dimethyl-1-heptene-4-oxy, 4-methyl-4-bromopentane-2-oxy, 4-methyl-5-bromopentane-2-oxy, 4-methyl-4,5-dibromopentane-2-oxy, 1-bromo-4-methylpentane-2-oxy, 2-bromo-4-methylpentane-2-oxy, 1,2-dibromo-4-methylpentane-2-oxy, 1-bromo-2-methylpentane-3-oxy, 2-bromo-2-methylpentane-3-oxy, 1,2-dibromo-2-methylpentane-3-oxy, 5-methyl-5-bromopentane-3-oxy, 5-methyl-6-bromopentane-3-oxy, 5-methyl-5,6-dibromopentane-3-oxy, 2,5-dimethyl-5-chlorohexane-3-oxy, 2,5-dimethyl-6-chlorohexane-3-oxy, 2,5-dimethyl-5,6-dichlorohexane-3-oxy, 1-chloro-2,4-dimethylpentane-3-oxy, 2-chloro-2,4-dimethylpentane-3-oxy, 1,2-dichloro-2,4-dimethylpentane-3-oxy, 1-chloro-2,5-dimethylhexane-3-oxy, 2-chloro-2,5-dimethylhexane-3-oxy, 1,2-dichloro-2,5-dimethylhexane-3-oxy, 1-chloro-2,5-dimethyl-5-hexene-3-oxy, 2-chloro-2,5-dimethyl-5-hexene-3-oxy, 1,2-dichloro-2,5-dimethyl-5-hexene-3-oxy, 2,5-dimethyl-5-chloro-1-hexene-3-oxy, 2,5-dimethyl-6-chloro-1-hexene-3-oxy, 2,5-dimethyl-5,6-dichloro-1-hexene-3-oxy, 1-chloro-3,5-dimethylheptane-4-oxy, 2-chloro-3,5-dimethylheptane-4-oxy, 1,2-dichloro-3,5-dimethylheptane-4-oxy, 1,6-dichloro-3,5-dimethylheptane-4-oxy, 1,7-dichloro-3,5-dimethylheptane-4-oxy, 4-methyl-5-chloropentane-2-oxy, 6-chloro-3,5-dimethyl-1-heptene-4-oxy, 7-chloro-3,5-dimethyl-1-heptene-4-oxy, 6,7-dichloro-3,5-dimethyl-1-heptene-4-oxy, 4-methyl-4-chloropentane-2-oxy, 4-methyl-5-chloropentane-2-oxy, 4-methyl-4,5-dichloropentane-2-oxy, 1-chloro-4-methylpentane-2-oxy, 2-chloro-4-methylpentane-2-oxy, 1,2-dichloro-4-methylpentane-2-oxy, 1-chloro-2-methylpentane-3-oxy, 2-chloro-2-methylpentane-3-oxy, 1,2-dichloro-2-methylpentane-3-oxy, 5-methyl-5-chloropentane-3-oxy, 5-methyl-6-chloropentane-3-oxy and 5-methyl-5,6-dichloropentane-3-oxy.

Examples of a divalent metal represented by Met in the formula (I) include Cu, Zn, Fe, Co, Ni, Ru, Rh, Pd, Pt, Pb, Mn and Mg, and examples of a mono-substituted trivalent metal include Al—Cl, Al—Br, In—Cl, In—Br, Ga—Cl and Ga—Br. Furthermore, examples of a di-substituted tetravalent metal include $SiCl_2$, $SiBr_2$, $SiF_2$, $SnCl_2$, $SnBr_2$, $SnF_2$, $GeCl_2$, $GeBr_2$, $GeF_2$, $Si(OH)_2$, $Sn(OH)_2$, $Ge(OH)_2$, $Si(OY)_2$, $Sn(OY)_2$, $Ge(OY)_2$, $Si(SY)_2$, $Sn(SY)_2$ and $Ge(SY)_2$ (wherein Y is an alkyl group, a phenyl group, a naphthyl group or its derivative), and examples of an oxymetal include VO, MnO and TiO. Above all, Cu, Ni, Co, Pd, Pt, Mg and VO are particularly preferable.

A method of synthesizing a phthalocyanine compound represented by the formula (1) comprises thermally reacting 1 to 4 kinds of compounds (the undermentioned s of at least one of these compounds is not 0) represented by the formula (2)

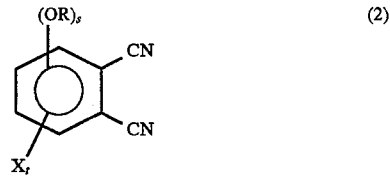

wherein R is an unsaturated hydrocarbon group, s is 0, 1 or 2, X is a halogen atom, and t is 0.1 or 2, with a metallic derivative in an alcohol in the presence of 1,8-diazabicyclo [5,4,0]-7-undecene (DBU), or it comprises thermally reacting the compound of the above-mentioned formula (2) with a metallic compound in a high-boiling solvent such as chloronaphthalene, bromonaphthalene or trichlorobenzene to synthesize a phthalocyanine having an unsaturated hydrocarbonoxy group, and then reacting this phthalocyanine with a halogenating agent such as thionyl chloride, sulfuryl chloride, hydrobromic acid, bromine, iodine or iodine monochloride giving halogen addition to the unsaturated hydrocarbon group (Rs). Alternatively, the phthalocyanine compound can also be produced by similarly reacting, as an intermediate, a diiminoisoindoline represented by the formula (3) obtained by reacting the compound of the formula (2) with ammonia in the presence of a catalyst comprising sodium methylate in an alcohol:

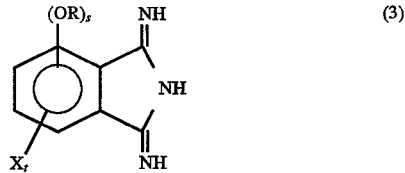

wherein R, s, X and t are as defined above.

In the present invention, the phthalocyanine compound represented by the formula (1), which contains the alkoxy group not substituted by the halogen atom, can also be obtained by mixing a compound of the formula (2) or (3) where R is a saturated hydrocarbon group with a compound of the formula (2) or (3) to synthesize a phthalocyanine compound in which partial Rs of the OR groups of the phthalocyanine are saturated hydrocarbon groups, and then reacting the thus synthesized compound with the above-mentioned halogenating agent.

The compound represented by the formula (2) can be, for example, synthesized by a process of the following formula (4):

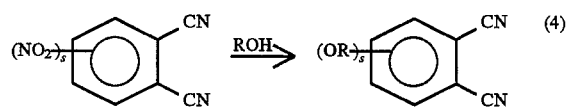

(3-)nitrophthalonitrile which is a starting material was available from Tokyo Chemicals Co., Ltd. The compound having the formula (2) was synthesized from (3-) nitrophthalonitrile in accordance with a process described in Nouveau Journal De Chimie, Vol. 6, p. 635–658, 1982. That is, an alcohol was reacted with sodium hydride to form sodium alkoxide, and this alkoxide was then reacted with (3-)nitrophthalonitrile at a temperature of from 0° to 100° C. to obtain the desired compound of the formula (2).

As a method for preparing an optical recording medium by the use of the phthalocyanine compound of the present invention, there is a process of applying or depositing one or two layers of 1 to 3 kinds of compounds containing the phthalocyanine of the present invention onto a transparent substrate. In the case of the applying process, a binder resin and the phthalocyanine of the present invention are dissolved in a solvent so that the content of the binder resin may be 20% by weight, preferably 0% and that of the phthalocyanine of the present invention may be in the range of from 0.05 to 20% by weight, preferably from 0.5 to 20% by weight, and the solution was then applied onto the substrate by means of a spin coater. On the other hand, in the case of the depositing process, the solution is deposited on the substrate at 100°–300° C. under $10^{-5}$ to $10^{-7}$ Torr. The thickness of the recording layer containing the phthalocyanine compound is about 100 Å–10,000 Å.

As the substrate, any of optically transparent resins can be used. Example of such resins include an acrylic resin, polyethylene resin, vinyl chloride resin, vinylidene chloride resin, polycarbonate resin, polyolefin copolymer resin, vinyl chloride copolymer resin, vinylidene chloride copolymer resin and styrene copolymer resin.

The substrate may be subjected to a surface treatment with a thermosetting resin or an ultraviolet-setting resin.

In the case that optical recording media (optical discs, optical cards and the like) are manufactured, it is preferred from the viewpoints of cost and handling properties for a user that the polyacrylate substrate or the polycarbonate substrate is used and the application is done by a spin coating method.

A solvent for use in the spin coating method should be selected in consideration of solvent resistance properties of the substrate, and suitable examples of such a solvent include halogenated hydrocarbons (e.g., dichloromethane, chloroform, carbon tetrachloride, tetrachloroethylene and dichlorodifluoroethane), ethers (e.g., tetrahydrofuran, diethyl ether, diisopropyl ether and dioxane), alcohols (e.g., methanol, ethanol and propanol), cellosolves (e.g., methyl cellosolve and ethyl cellosolve), and hydrocarbons (e.g., hexane, octane, benzene, toluene and xylene).

The formation of the recording medium can be achieved by covering the substrate with a recording layer as described above, by integrally sticking two substrates having recording layers with the interposition of an air gap, or by applying a reflective layer (aluminum or gold) on a recording layer, and then laminating a protective layer of a thermosetting (photo-setting) resin thereon. The phthalocyanine compound of the present invention (the content is 0.001% to 100%) can be also used as a variety of potential infrared absorbing agents.

Next, the present invention will be described in detail in reference to examples, but the scope of the present invention should not be limited to these examples.

EXAMPLE 1

9.6 g (0.24 mol) of 60% sodium hydride and 150 ml of N,N-dimethylformamide were placed in a container equipped with a stirrer, a reflux condenser and a nitrogen-introducing tube, and the solution was then stirred under the feed of nitrogen. Afterward, 32 g (0.25 mol) of 2,5-dimethyl-5-hexene-3-ol was added dropwise thereto at 20°–30° C. over 1 hour, and the solution was then stirred at the same temperature for 3 hours to prepare a sodium alcoholate solution. Next, 34.6 g (0.2 mol) of 3-nitrophthalonitrile and 150 ml of N,N-dimethylformamide were placed in a container equipped with a stirrer, and the above-mentioned sodium alcoholate solution was then added dropwise at 0° C. or less over 5 hours. After completion of the addition, the temperature of the solution was raised up to a level of 20°–30° C., and the solution was then stirred for 2 hours to bring reaction to an end. The thus obtained reaction solution was poured into 3 l of water and then stirred for 30 minutes, and 500 ml of toluene were added. After stirring for 30 minutes, the solution was allowed to stand to separate a toluene layer. After toluene was distilled off under reduced pressure, recrystallization was carried out from 500 ml of n-hexane to obtain 43.7 g of 3-(2,5-dimethyl-5-hexene-3-oxy)phthalonitrile (yield=86.0%).

| Elemental analysis: $C_{16}H_{18}N_2O$ | | | |
|---|---|---|---|
| | C | H | N |
| Calcd. (%) | 75.59 | 7.09 | 11.02 |
| Found (%) | 75.08 | 7.11 | 11.25 |

Next, 25.4 g (0.1 mol) of the thus obtained 3-(2,5-dimethyl-5-hexene-3-oxy)phthalonitrile, 15.2 g (0.1 mol) of DBU and 120 g of n-amyl alcohol were placed in a container equipped with a stirrer, a reflux condenser and a nitrogen-introducing tube, and the solution was then heated up to 110° C. under a nitrogen atmosphere. Moreover, 5.3 g (0.03 mol) of palladium chloride were added at the same temperature, and reaction was carried out at 120° C. for 10 hours. After cooling, insolubles were removed by filtration, and the resulting filtrate was concentrated under reduced pressure to collect the solvent. Afterward, column purification (300 g of silica gel, toluene development) was made to obtain deep green crystals of a phthalocyanine palladium compound having unsaturated hydrocarbonoxy groups. Its yield was 17.4 g (yield ratio=62.1%). Maximum absorption wavelength ($\lambda_{max}$), gram absorptivity coefficient ($\epsilon_g$) and the results of elemental analysis were as follows:

$\lambda_{max}$=688.5 nm $\epsilon_g$=1.9×10$^5$ g$^{-1}$

| Elemental analysis: $C_{64}H_{72}N_8O_4Pd$ | | | |
|---|---|---|---|
| | C | H | N |
| Calcd. (%) | 68.42 | 6.41 | 9.98 |
| Found (%) | 68.19 | 6.52 | 9.63 |

5 g (4.50 mmols) of palladium tetra-α-(2,5-dimethyl-5-hexene-3-oxy)phthalocyanine were dissolved in 30 g of 1,1,2-trichloroethane, and 10 g of water were then added thereto. Next, a mixed solution of 5.4 g (33.79 mmols) of bromine and 6 g of 1,1,2-trichloroethane was added dropwise to the solution at 50°–55° C., and reaction was carried out at 55°–60° C. for 1 hour. Afterward, 5 g of a 15% aqueous sodium hydrogensulfite solution were added to the solution to wash it. The resulting organic layer was added dropwise to 80 g of methanol, and the precipitated crystals were collected by filtration to obtain 8.0 g of a brominated phthalocyanine. It was elucidated by NMR that bromine atoms were substituted on all the double bonds of side chains, and it was also elucidated by elemental analysis that 11.5 bromine atoms were substituted. Hence, it is apparent that the ring was substituted by 3.5 bromine atoms.

Elemental analysis: $C_{64}H_{68.x}N_8O_4Br_{11.x}Pd$

|  | C | H | N | Br |
|---|---|---|---|---|
| Found (%) | 37.72 | 3.41 | 5.49 | 44.96 |
| Calcd. (%) | 37.69 | 3.39 | 5.52 | 45.07 |

$\lambda_{max}=708.5$ nm $\epsilon_g=1.3\times10^5\ g^{-1}$

EXAMPLE 2

5 g of the brominated phthalocyanine obtained in Example 1 were dissolved in 500 ml of n-octane, and the solution was then applied onto a polycarbonate substrate by spin coating to form a recording layer of thickness of about 800 Å. Next, gold was sputtered thereon to form a reflective layer, thereby forming a CD-R medium. The reflectance of this medium was 71% (775–790 nm), and EFM signals could be written on the medium at a linear velocity of 1.3 m/sec at a power of 5.5 mW by the use of a semiconductor laser at 780 nm. At this time, an error rate was less than 10.

EXAMPLE 3

5 g (4.50 mmols) of palladium tetra-α-(2,5-dimethyl-5-hexene-3-oxy)phthalocyanine synthesized in Example 1 were dissolved in 35 g of 1,1,2,2-tetrachloroethane, and the solution was then heated up to 50°–60° C. Afterward, 3.1 g (18.01 mmols) of 47% hydrobromic acid were added dropwise at the same temperature, and reaction was carried out at 60°–70° C. for 1 hour. After cooling to 20° C., the solution was washed with 10 g of a 10% aqueous sodium hydrogensulfite solution and 10 g of a 5% aqueous sodium hydrogencarbonate solution. The resulting organic layer was separated and then added dropwise to 90 g of methanol, and the precipitated crystals were collected by filtration to obtain 5.8 g of a brominated phthalocyanine. It was elucidated by elemental analysis that 4 bromine atoms were substituted, and it was also elucidated by FD-MS that all the bromine atoms were substituted on side chains.

Elemental analysis: $C_{64}H_{76}N_8O_4Br_4Pd$

|  | C | H | N | Br |
|---|---|---|---|---|
| Found (%) | 53.25 | 5.32 | 7.66 | 21.91 |
| Calcd. (%) | 53.11 | 5.29 | 7.74 | 22.08 |

$\lambda_{max}=688.5$ nm $\epsilon_g=1.5\times10^5\ g^{-1}$

EXAMPLE 4

5 g of the brominated phthalocyanine synthesized in Example 3 were dissolved in 500 ml of dibutyl ether, and the solution was then applied onto an optical card substrate made of a polycarbonate by spin coating. Next, a protective layer was then formed on the applied surface, thereby preparing an optical card. This optical card could be recorded at a linear velocity of 2 m/sec by a semiconductor laser beam of 4 mW, and a CN ratio was 63 dB. The optical card could be reproduced at a linear velocity of 2 m/sec by a laser beam of 0.8 mW, and even when the reproduction was done $10^5$ times, any record did not change.

EXAMPLE 5

9.6 g (0.24 mol) of 60% sodium hydride and 150 ml of N,N-dimethylformamide were placed in a container equipped with a stirrer, a reflux condenser and a nitrogen-introducing tube, and the solution was then stirred under the feed of nitrogen. Afterward, 35 g (0.25 mol) of 3,5-dimethyl-1,6-heptadiene-4-ol was added dropwise thereto at 20°–30° C. over 1 hour, and the solution was then stirred at the same temperature for 3 hours to prepare a sodium alcoholate solution. Next, 34.6 g (0.2 mol) of 3-nitrophthalonitrile and 150 ml of N,N-dimethylformamide were placed in a container equipped with a stirrer, and the above-mentioned sodium alcoholate solution was added dropwise thereto at 0° C. or less over 5 hours. After completion of the addition, the temperature of the solution was raised up to a level of 20°–30° C., and the solution was then stirred for 3 hours to bring reaction to an end. The thus obtained reaction solution was poured into 3 l of water and then stirred for 30 minutes, and 500 ml of toluene were added. After stirring for 30 minutes, the resulting toluene layer was separated. After toluene was distilled off under reduced pressure, recrystallization was carried out from 600 ml of n-hexane to obtain 44.7 g of 3-(3,5-dimethyl-1,6-heptadiene-4-oxy)phthalonitrile (yield=84.0%).

Elemental analysis: $C_{17}H_{18}N_2O$

|  | C | H | N |
|---|---|---|---|
| Calcd. (%) | 76.69 | 6.77 | 10.53 |
| Found (%) | 76.52 | 6.91 | 10.38 |

Next, 26.6 g (0.1 mol) of the thus obtained 3-(3,5-dimethyl-1,6-heptadiene-4-oxy)phthalonitrile, 15.2 g (0.1 mol) of DBU and 125 g of n-amyl alcohol were placed in a container equipped with a stirrer, a reflux condenser and a nitrogen-introducing tube, and the solution was then heated up to 110° C. under a nitrogen atmosphere. Moreover, 5.3 g (0.03 mol) of palladium chloride were added at the same temperature, and reaction was carried out at 120°–130° C. for 9 hours. After cooling, insolubles were removed by filtration, and the resulting filtrate was concentrated under reduced pressure to collect the solvent. Afterward, column purification (500 g of silica gel, toluene development) was made to obtain deep green crystals of a phthalocyanine palladium compound having unsaturated hydrocarbonoxy groups. Its yield was 19.0 g (yield ratio=65%). Maximum absorption wavelength ($\lambda_{max}$), gram absorptivity coefficient ($\epsilon_g$) and the results of elemental analysis were as follows:

$\lambda_{max}=690.0$ nm $\epsilon_g=1.9\times10^5\ g^{-1}$

Elemental analysis: $C_{68}H_{72}N_8O_4Pd$

|  | C | H | N |
|---|---|---|---|
| Calcd. (%) | 69.72 | 6.15 | 9.57 |
| Found (%) | 69.81 | 6.05 | 9.62 |

10 g (8.53 mmols) of palladium tetra-α-(3,5-dimethyl-1,6-heptadiene-4-oxy)phthalocyanine were added to a mixed solution of 50 g of dichloromethane, 50 g of n-hexane and 100 g of water, and 4.8 g (30.03 mmols) of bromine were added dropwise, and reaction was carried out at 40° C. for 2 hours. After cooling to 20° C., 50 g of toluene were added, followed by separation. Successively, the resulting organic layer was washed with 100 g of a 10% aqueous sodium hydrogensulfite solution and 100 g of a 5% aqueous sodium hydrogencarbonate solution. After the organic solvent was distilled off, column purification (500 g of silica gel, toluene development) was made to obtain 11.0 g of a brominated phthalocyanine. It was elucidated by elemental analysis and FD-MS that 6.6 bromine atoms were substituted on side chains.

Elemental analysis: $C_{68}H_{72}N_8O_4Br_{6.6}Pd$

|  | C | H | N | Br |
|---|---|---|---|---|
| Found (%) | 48.15 | 3.84 | 6.63 | 30.95 |
| Calcd. (%) | 48.07 | 4.00 | 6.59 | 31.04 |

$\lambda_{max}$=691.5 nm $\epsilon_g$=1.2×10$^5$ g$^{-1}$

EXAMPLE 6

10 g of the brominated phthalocyanine synthesized in Example 5 were dissolved in 1000 g of n-octane, and the solution was then applied onto a substrate made of a polycarbonate by spin coating to form an optical recording medium having a recording layer of thickness of about 800 Å. When recording was done at a power of 7 mW by a semiconductor laser beam at 780 nm, a CN ratio of 60 dB was obtained. Reproduction was carried out 10$^5$ times by a reproduction beam at 0.5 mW, but any record did not change. Furthermore, even after 1000 hours under conditions of 80° C. and 80% RH, any record did not change.

EXAMPLE 7

26.6 g (0.1 mol) of 3-(3,5-dimethyl-1,6-heptadiene-4-oxy)phthalonitrile synthesized in Example 5, 15.2 g (0.1 mol) of DBU and 120 g of n-amyl alcohol were placed in a container equipped with a stirrer, a reflux condenser and a nitrogen-introducing tube, and the solution was then heated up to 110° C. under a nitrogen atmosphere. Moreover, 3.0 g (0.03 mol) of cuprous chloride were added at the same temperature, and reaction was carried out at 135° C. for 10 hours. After completion of the reaction, the solution was cooled, and insolubles were then removed by filtration. The resulting filtrate was concentrated under reduced pressure to collect the solvent. Afterward, column purification (500 g of silica gel, toluene development) was made to obtain deep green crystals of a phthalocyanine copper compound having unsaturated hydrocarbonoxy groups. Its yield was 21.4 g (yield ratio=76%). Maximum absorption wavelength ($\lambda_{max}$), gram absorptivity coefficient ($\epsilon_g$) and the results of elemental analysis were as follows:

$\lambda_{max}$=706.0 nm $\epsilon_g$=1.6×10$^5$ g$^{-1}$ (solvent: toluene)

Elemental analysis: $C_{68}H_{72}N_8O_4Cu$

|  | C | H | N |
|---|---|---|---|
| Calcd. (%) | 72.37 | 6.38 | 9.93 |
| Found (%) | 72.41 | 6.52 | 9.81 |

10 g (8.86 mmols) of copper tetra-α-(3,5-dimethyl-1,6-heptadiene-4-oxy)phthalocyanine were added to a mixed solution of 40 g of tetrahydrofuran, 40 g of n-hexane and 100 g of water, and 5.5 g (34.41 mmols) of bromine were added and reaction was carried out at 40° C. for 2 hours. After cooling to 20° C., 40 g of toluene were added, followed by separation. Successively, the resulting organic layer was washed with 80 g of a 10% aqueous sodium hydrogensulfite solution and 80 g of a 5% aqueous sodium hydrogencarbonate solution. After the organic solvent was distilled off, column purification (500 g of silica gel, toluene development) was made to obtain 13.7 g of a brominated phthalocyanine. It was elucidated by elemental analysis and FD-MS that 7.4 bromine atoms were substituted on side chains.

Elemental analysis: $C_{68}H_{72}N_8O_4Br_{7.4}Cu$

|  | C | H | N | Br |
|---|---|---|---|---|
| Found (%) | 47.29 | 4.36 | 6.60 | 34.45 |
| Calcd. (%) | 47.48 | 4.22 | 6.52 | 34.38 |

$\lambda_{max}$=706.5 nm $\epsilon_g$=1.2×10$^5$ g$^{-1}$

EXAMPLE 8

10 g of the brominated phthalocyanine obtained in Example 7 were dissolved in 1000 g of n-octane, and the solution was then applied onto a polycarbonate substrate by spin coating to form a recording layer of thickness of about 800 Å. Next, gold was sputtered thereon to form a reflective layer, thereby forming a CD-R medium. The reflectance of this medium was 73% (775–790 nm), and EFM signals could be written on the medium at a linear velocity of 1.3 m/sec at a power of 6.0 mW by the use of a semiconductor laser at 780 nm. At this time, an error rate was less than 10.

EXAMPLE 9

5 g (4.50 mmols) of palladium tetra-α-(2,5-dimethyl-5-hexene-3-oxy)phthalocyanine synthesized in Example 1 were dissolved in 30 g of 1,1,2-trichloroethane, and 10 g of water were then added. Next, 6.4 g (45.0 mmols) of sulfuryl chloride (95 wt %) were added dropwise at 50°–60° C., and reaction was carried out at 60°–70° C. for 1 hour. After cooling to 30° C., a 10% aqueous sodium hydroxide solution was added dropwise until a pH of an aqueous layer portion became about 7.0. The resulting organic layer was separated and then added dropwise to 180 g of methanol, and the precipitated crystals were collected by filtration to obtain 6.8 g of a chlorinated phthalocyanine. It was elucidated by elemental analysis that 12 chlorine atoms were substituted, and it was also elucidated by NMR that the double bonds of side chains are all chlorinated.

Elemental analysis: $C_{64}H_{68}N_8O_4Cl_{12}Pd$

|  | C | H | N | Cl |
|---|---|---|---|---|
| Found (%) | 49.55 | 4.40 | 7.30 | 27.45 |
| Calcd. (%) | 49.75 | 4.44 | 7.25 | 27.53 |

$\lambda_{max}$=702.0 nm $\epsilon_g$=1.3×10$^5$ g$^{-1}$

EXAMPLE 10

5 g of the chlorinated phthalocyanine obtained in Example 9 were dissolved in 500 ml of dimethylcyclohexane, and the solution was then applied onto a polycarbonate substrate by spin coating to form a recording layer of thickness of about 800 Å. Next, gold was sputtered thereon to form a reflective layer, thereby forming a CD-R medium. The reflectance of this medium was 74% (775–790 nm), and EFM signals could be written on the medium at a linear velocity of 1.3 m/sec at a power of 6 mW by the use of a semiconductor laser at 780 nm. At this time, an error rate was less than 10.

Comparative Example 1

9.6 g (0.24 mol) of 60% sodium hydride and 150 ml of N,N-dimethylformamide were placed in a container equipped with a stirrer, a reflux condenser and a nitrogen-introducing tube, and the solution was then stirred under the feed of nitrogen. Afterward, 29.5 g (0.25 mol) of 2-fluoro-1-cyclohexanol were added dropwise thereto at 20°–30° C. over 1 hour, and the solution was then stirred at the same temperature for 3 hours to prepare a sodium alcoholate solution. Next, 34.6 g (0.2 mol) of 3-nitrophthalonitrile and 150 ml of N,N-dimethylformamide were placed in a container equipped with a stirrer, and the above-mentioned sodium alcoholate solution was added dropwise thereto at 0° C. or less over 5 hours. After completion of the addition, the temperature of the solution was raised up to a level of 20°–30° C., and the solution was then stirred for 2 hours to bring reaction to an end. The thus obtained reaction solution was poured into 3 l of water and then stirred for 30 minutes, and 500 ml of toluene were added. After stirring for 30 minutes, the solution was allowed to stand to separate a toluene layer. After toluene was distilled off under reduced pressure, recrystallization was carried out from 600 ml of n-hexane to obtain 44.0 g of 3-(2-fluoro-1-cyclohexane-1-oxy)phthalonitrile (yield=90.0%).

| Elemental analysis: $C_{17}H_{17}N_2OF$ | | | | |
|---|---|---|---|---|
| | C | H | N | F |
| Calcd. (%) | 68.83 | 5.36 | 11.47 | 7.78 |
| Found (%) | 68.88 | 5.31 | 11.39 | 7.72 |

Next, 22.4 g (0.1 mol) of the thus obtained 3-(2-fluoro-1-cyclohexane-1-oxy)phthalonitrile, 15.2 g (0.1 mol) of DBU and 120 g of n-amyl alcohol were placed in a container equipped with a stirrer, a reflux condenser and a nitrogen-introducing tube, and the solution was then heated up to 110° C. under a nitrogen atmosphere. Moreover, 3.0 g (0.03 mol) of cuprous chloride were added at the same temperature, and reaction was carried out at 135° C. for 10 hours. After completion of the reaction, the solution was cooled, and insolubles were then removed by filtration. The resulting filtrate was concentrated under reduced pressure to collect the solvent. Afterward, column purification (500 g of silica gel, toluene development) was made to obtain deep green crystals of a phthalocyanine copper compound having fluorine-substituted hydrocarbonoxy groups. Its yield was 21.4 g (yield ratio=76%). Maximum absorption wavelength ($\lambda_{max}$), gram absorptivity coefficient ($\epsilon_g$) and the results of elemental analysis were as follows:

$\lambda_{max}$=704.0 nm $\epsilon_g$=1.5×10$^5$ g$^{-1}$

| Elemental analysis: $C_{56}H_{52}N_8O_4F_4Cu$ | | | | |
|---|---|---|---|---|
| | C | H | N | F |
| Calcd. (%) | 64.64 | 5.03 | 10.77 | 7.30 |
| Found (%) | 64.55 | 5.08 | 10.80 | 7.38 |

Comparative Example 2

5 g of the fluorinated phthalocyanine obtained in Comparative Example 1 were dissolved in 500 ml of n-octane, and the solution was then applied onto a polycarbonate substrate by spin coating to form a reocrding layer of thickness of about 800 Å. Next, gold was sputtered thereon to form a reflective layer, thereby forming a CD-R medium. The reflectance of this medium was 72% (775–790 nm), and in writing EFM signals on the medium at a linear velocity of 1.3 m/sec by the use of a semiconductor laser at 780 nm, a power of 10 mW was required. At this time, an error rate was 120.

Examples 11 to 20, and Comparative Examples 3 and 4

Phthalocyanine compounds shown in Table 1 were synthesized by the same procedure as in Example 1, and CD-R media were prepared by the same procedure as in Example 2. Next, laser powers (mW) necessary to write EFM signals at a linear velocity of 1.3 m/sec by the use of a semiconductor laser at 780 nm were measured, and at this time, error rates were also evaluated. With regard to the evaluation of the error rates, ○ means that the error rate is less than 10, and X means that the error rate is more than 10. The results are shown in Table 1.

TABLE 1

| | Phthalocyanine | Writing Power | Error Rate |
|---|---|---|---|
| Example 11 | (structure) | 4.5 mW | ○ |

TABLE 1-continued
| | Phthalocyanine | Writing Power | Error Rate |
|---|---|---|---|
| Example 12 | 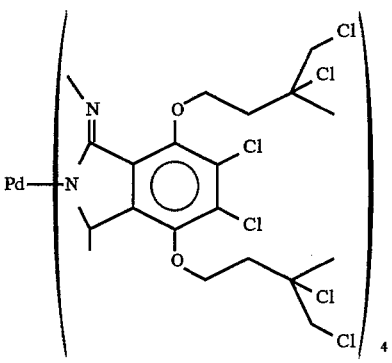 | 6.0 mW | ○ |
| Example 13 | 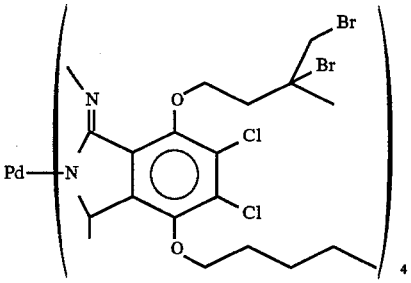 | 6.0 mW | ○ |
| Example 14 | 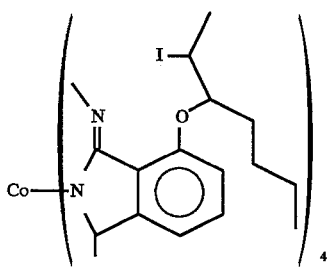 | 6.0 mW | ○ |
| Example 15 | 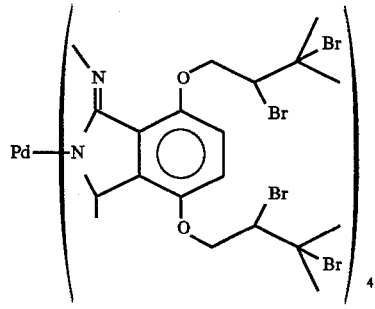 | 5.0 mW | ○ |
| Example 16 | 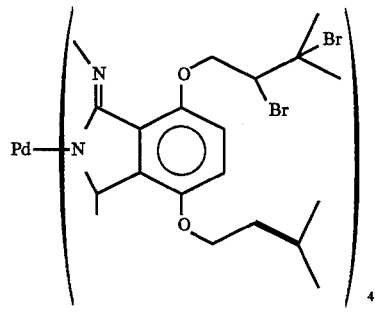 | 5.0 mW | ○ |

TABLE 1-continued

| | Phthalocyanine | Writing Power | Error Rate |
|---|---|---|---|
| Example 17 | (structure with VO center, OCH2CH2CH2CH2CH(I)CH3 substituent) | 6.5 mW | ○ |
| Example 18 | (structure with Mg center, O-CH(iPr)CH2C(CH3)(Br)CH2Br substituent) | 5.5 mW | ○ |
| Example 19 | (structure with Mg center, O-CH(iPr)CH2CH2I substituent) | 5.0 mW | ○ |
| Example 20 | (structure with Mg center, two OCH2CH(Br)C(CH3)2Br substituents and two Cl substituents) | 5.5 mW | ○ |
| Comp. Example 3 | (structure with Cu center, O-CH(CH3)CH2CH(CH3)2 substituent) | 10.0 mW | × |

TABLE 1-continued

| | Phthalocyanine | Writing Power | Error Rate |
|---|---|---|---|
| Comp. Example 4 | 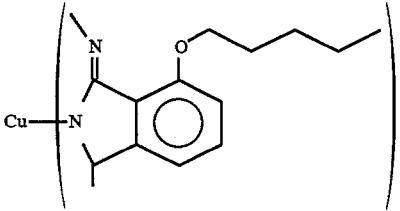 | 105 mW | x |

What is claimed is:

1. A phthalocyanine represented by the formula (1)

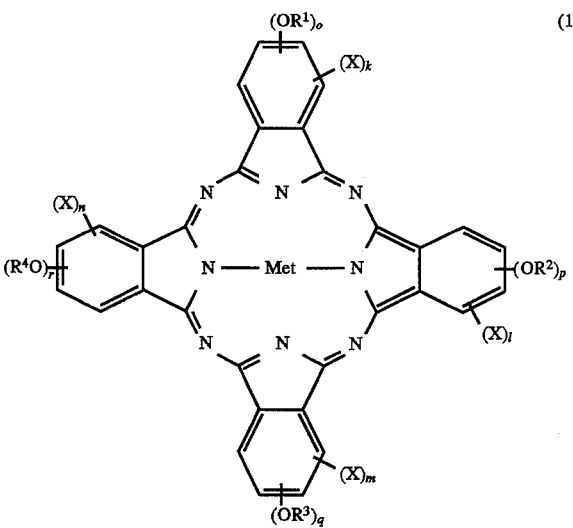 (1)

wherein each of (OR$^1$), (OR$^2$), (OR$^3$) and (OR$^4$) is independently a branched alkoxy group substituted by 0 to 5 halogen atoms and having 5 to 20 carbon atoms, an alkenyloxy group substituted by 0 to 5 halogen atoms and having 2 to 20 carbon atoms or an alkynyloxy group substituted by 0 to 5 halogen atoms and having 2 to 20 carbon atoms, wherein each halogen atom substituted on R$^1$, R$^2$, R$^3$ and R$^4$ is chlorine, bromine or iodine and at least one of R$^1$, R$^2$, R$^3$ and R$^4$ is substituted by the halogen atom; X is a halogen atom; each of k, l, m and n is independently a value of from 0 to 3; each of o, p, q and r is independently a value of 0, 1 or 2, and all of them are not 0 simultaneously; each sum of k and o, l and p, m and q, and n and r is independently in the range of from 0 to 4; Met is two hydrogen atoms, a divalent metal atom, a trivalent mono-substituted metal atom, a tetravalent di-substituted metal atom or an oxy-metal atom.

2. The phthalocyanine according to claim 1 wherein each of R$^1$, R$^2$, R$^3$ and R$^4$ in the formula (1) is independently an alkyl group substituted by 0 to 5 halogen atoms and having 5 to 15 carbon atoms, an alkenyl group substituted by 0 to 5 halogen atoms and having 5 to 15 carbon atoms or an alkynyl group substituted by 0 to 5 halogen atoms and having 5 to 15 carbon atoms, and at least one of R$^1$, R$^2$, R$^3$ and R$^4$ is substituted by the halogen atom; X is a halogen atom; all of o, p, q and r are 1.

3. The phthalocyanine according to claim 1 wherein X in the formula (1) is chlorine, bromine or iodine.

4. The phthalocyanine according to claim 1 wherein each of R$^1$, R$^2$, R$^3$ and R$^4$ is a branched alkyl group, alkenyl group or alkynyl group.

5. The phthalocyanine according to claim 1 wherein Met is Cu, Pd, Co, Mg or VO.

6. The phthalocyanine according to claim 5 wherein the halogen atom substituted on R$^1$, R$^2$, R$^3$ and R$^4$ is bromine or iodine, and X is bromine.

7. The phthalocyanine according to claim 1, wherein each of R$^1$, R$^2$, R$^3$ and R$^4$ is in the alpha-position on said phthalocyanine ring.

8. The phthalocyanine according to claim 7, wherein at least one of k, l, m and n is 1–3.

9. A near infrared absorbing agent comprising a phthalocyanine represented by the formula (1)

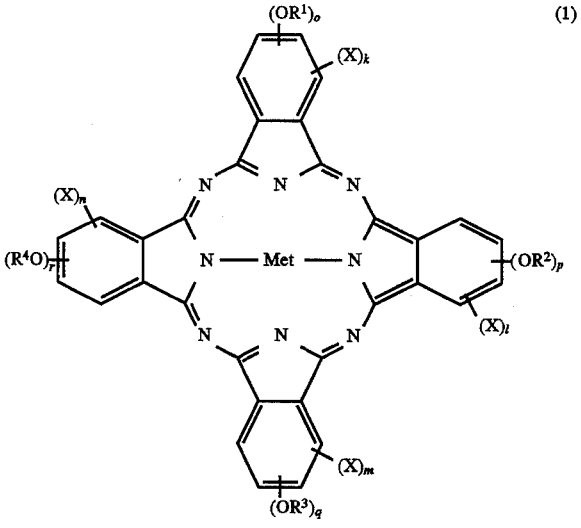 (1)

wherein each of (OR$^1$), (OR$^2$), (OR$^3$) and (OR$^4$) is independently a branched alkoxy group substituted by 0 to 5 halogen atoms and having 5 to 20 carbon atoms, an alkenyloxy group substituted by 0 to 5 halogen atoms and having 2 to 20 carbon atoms or an alkynyloxy group substituted by 0 to 5 halogen atoms and having 2 to 20 carbon atoms, wherein each halogen atom substituted on R$^1$, R$^2$, R$^3$ and R$^4$ is chlorine, bromine or iodine and at least one of R$^1$, R$^2$, R$^3$ and R$^4$ is substituted by the halogen atom; X is a halogen atom; each of k, l, m and n is independently a value of from 0 to 3; each of o, p, q and r is independently a value of 0, 1 or 2, and all of them are not 0 simultaneously; each sum of k and o, l and p, m and q, and n and r is independently in the range of from 0 to 4; Met is two hydrogen atoms, a divalent metal atom, a trivalent mono-substituted metal atom, a tetravalent di-substituted metal atom or an oxy-metal atom, which is present in said agent in an amount ranging from 0.001% to 100%.

10. The near infrared absorbing agent according to claim 9 wherein each of $R^1$, $R^2$, $R^3$ and $R^4$ in the formula (1) is independently an alkyl group substituted by 0 to 5 halogen atoms and having 5 to 15 carbon atoms, an alkenyl group substituted by 0 to 5 halogen atoms and having 5 to 15 carbon atoms or an alkynyl group substituted by 0 to 5 halogen atoms and having 5 to 15 carbon atoms, and at least one of $R^1$, $R^2$, $R^3$ and $R^4$ is substituted by the halogen atom; X is a halogen atom; all of o, p, q and r are 1.

11. The near infrared absorbing agent according to claim 9 wherein X in the formula (1) is chlorine, bromine or iodine.

12. The near infrared absorbing agent according to claim 9, wherein each of $(OR^1)$, $(OR^2)$, $(OR^3)$ and $(OR^4)$ is a branched alkoxy group, an alkenyloxy group or an alkynyloxy group.

13. The near infrared absorbing agent according to claim 9 wherein Met is Cu, Pd, Co, Mg or VO.

14. The near infrared absorbing agent according to claim 13 wherein the halogen atom substituted on $R^1$, $R^2$, $R^3$ and $R^4$ is bromine or iodine, and X is bromine.

15. The near infrared absorbing agent according to claim 9, wherein each of $R^1$, $R^2$, $R^3$ and $R^4$ is in the alpha-position on said phthalocyanine ring.

16. The near infrared absorbing agent according to claim 15, wherein at least one of k, l, m and n is 1–3.

* * * * *